United States Patent
Thompson

(10) Patent No.: US 6,439,005 B1
(45) Date of Patent: Aug. 27, 2002

(54) ANTI-THEFT SECURITY DEVICE FOR VEHICLES

(76) Inventor: Dalton Thompson, 32 Mounachie Rd. Apt 3 E, Hackensack, NJ (US) 07601

( * ) Notice: Subject to any disclaimer, the term of this patent is extended or adjusted under 35 U.S.C. 154(b) by 0 days.

(21) Appl. No.: 09/747,897

(22) Filed: Dec. 26, 2000

(51) Int. Cl.[7] .............................................. B60R 25/00
(52) U.S. Cl. ............................ 70/18; 70/202; 70/203; 70/238; 70/424; 70/455
(58) Field of Search ............................ 70/18, 202, 203, 70/209, 424, 428, 455, 237, 238, 247

(56) References Cited

U.S. PATENT DOCUMENTS

| | | | | |
|---|---|---|---|---|
| 1,531,062 A | * | 3/1925 | Barravecchia | 70/211 |
| 1,967,007 A | * | 7/1934 | Grogan et al. | 70/202 |
| 2,078,724 A | * | 4/1937 | Dupuis | 70/202 |
| 3,690,131 A | | 9/1972 | Davis | 70/203 |
| 3,990,280 A | | 11/1976 | Jahn | 70/238 |
| 4,615,192 A | * | 10/1986 | Brown | 70/202 X |
| 4,658,613 A | | 4/1987 | Solow | 70/427 |
| 4,699,238 A | * | 10/1987 | Tamir | 70/238 X |
| 5,025,646 A | * | 6/1991 | Waguespack, Jr. | 70/237 X |
| D322,925 S | | 1/1992 | Solow | D8/331 |
| 5,653,133 A | * | 8/1997 | Passantino | 70/238 |
| 5,724,838 A | | 3/1998 | Alicea | 70/18 |
| 5,921,355 A | | 7/1999 | Mostrom | 70/252 X |

FOREIGN PATENT DOCUMENTS

| | | | | |
|---|---|---|---|---|
| FR | 532522 | * | 11/1921 | 70/212 |
| FR | 25551 | * | 1/1923 | 70/212 |
| GB | 330475 | * | 6/1930 | 70/211 |

* cited by examiner

*Primary Examiner*—Lloyd A. Gall

(57) ABSTRACT

An anti-theft security device for vehicles for preventing a user's vehicle from being stolen. The anti-theft security device for vehicles includes a tubular member being removably and securely and lockingly fastened about a steering wheel column; and also includes a shield/support member being integrally attached to the tubular member; and further includes an arm locking mechanism being securely attached to the shield/support member; and also includes an arm member being movably and lockingly attached to the locking mechanism.

10 Claims, 2 Drawing Sheets

ANTI-THEFT SECURITY DEVICE FOR VEHICLES

BACKGROUND OF THE INVENTION

1. Field of the Invention

The present invention relates to a brake pedal locking device for a vehicle and more particularly pertains to a new anti-theft security device for vehicles for preventing a user's vehicle from being stolen.

2. Description of the Prior Art

The use of a brake pedal locking device for a vehicle is known in the prior art. More specifically, a brake pedal locking device for a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,990,280; 5,724, 838; 4,658,613; 5,921,355; 3,690,131; and U.S. Pat. No. Des. 322,925.

While these devices fulfill their respective, particular objectives and requirements, the aforementioned patents do not disclose a new anti-theft security device for vehicles. The inventive device includes a tubular member being removably and securely and lockingly fastened about a steering wheel column; and also includes a shield/support member being integrally attached to the tubular member; and further includes an arm locking mechanism being securely attached to the shield/support member; and also includes an arm member being movably and lockingly attached to the locking mechanism.

In these respects, the anti-theft security device for vehicles according to the present invention substantially departs from the conventional concepts and designs of the prior art, and in so doing provides an apparatus primarily developed for the purpose of preventing a user's vehicle from being stolen.

SUMMARY OF THE INVENTION

In view of the foregoing disadvantages inherent in the known types of brake pedal locking device for a vehicle now present in the prior art, the present invention provides a new anti-theft security device for vehicles construction wherein the same can be utilized for preventing a user's vehicle from being stolen.

The general purpose of the present invention, which will be described subsequently in greater detail, is to provide a new anti-theft security device for vehicles which has many of the advantages of the brake pedal locking device for a vehicle mentioned heretofore and many novel features that result in a new anti-theft security device for vehicles which is not anticipated, rendered obvious, suggested, or even implied by any of the prior art brake pedal locking device for a vehicle, either alone or in any combination thereof.

To attain this, the present invention generally comprises a tubular member being removably and securely and lockingly fastened about a steering wheel column; and also includes a shield/support member being integrally attached to the tubular member; and further includes an arm locking mechanism being securely attached to the shield/support member; and also includes an arm member being movably and lockingly attached to the locking mechanism.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new anti-theft security device for vehicles which has many of the advantages of the brake pedal locking device for a vehicle mentioned heretofore and many novel features that result in a new anti-theft security device for vehicles which is not anticipated, rendered obvious, suggested, or even implied by any of the prior art brake pedal locking device for a vehicle, either alone or in any combination thereof.

It is another object of the present invention to provide a new anti-theft security device for vehicles which may be easily and efficiently manufactured and marketed.

It is a further object of the present invention to provide a new anti-theft security device for vehicles which is of a durable and reliable construction.

An even further object of the present invention is to provide a new anti-theft security device for vehicles which is susceptible of a low cost of manufacture with regard to both materials and labor, and which accordingly is then susceptible of low prices of sale to the consuming public, thereby making such anti-theft security device for vehicles economically available to the buying public.

Still yet another object of the present invention is to provide a new anti-theft security device for vehicles which provides in the apparatuses and methods of the prior art some of the advantages thereof, while simultaneously overcoming some of the disadvantages normally associated therewith.

Still another object of the present invention is to provide a new anti-theft security device for vehicles for preventing a user's vehicle from being stolen.

Yet another object of the present invention is to provide a new anti-theft security device for vehicles which includes a tubular member being removably and securely and lockingly fastened about a steering wheel column; and also includes a shield/support member being integrally attached to the tubular member; and further includes an arm locking mechanism being securely attached to the shield/support member; and also includes an arm member being movably and lockingly attached to the locking mechanism.

Still yet another object of the present invention is to provide a new anti-theft security device for vehicles that prevents tampering with the ignition of the vehicle.

Even still another object of the present invention is to provide a new anti-theft security device for vehicles that prevents access to the engine compartment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
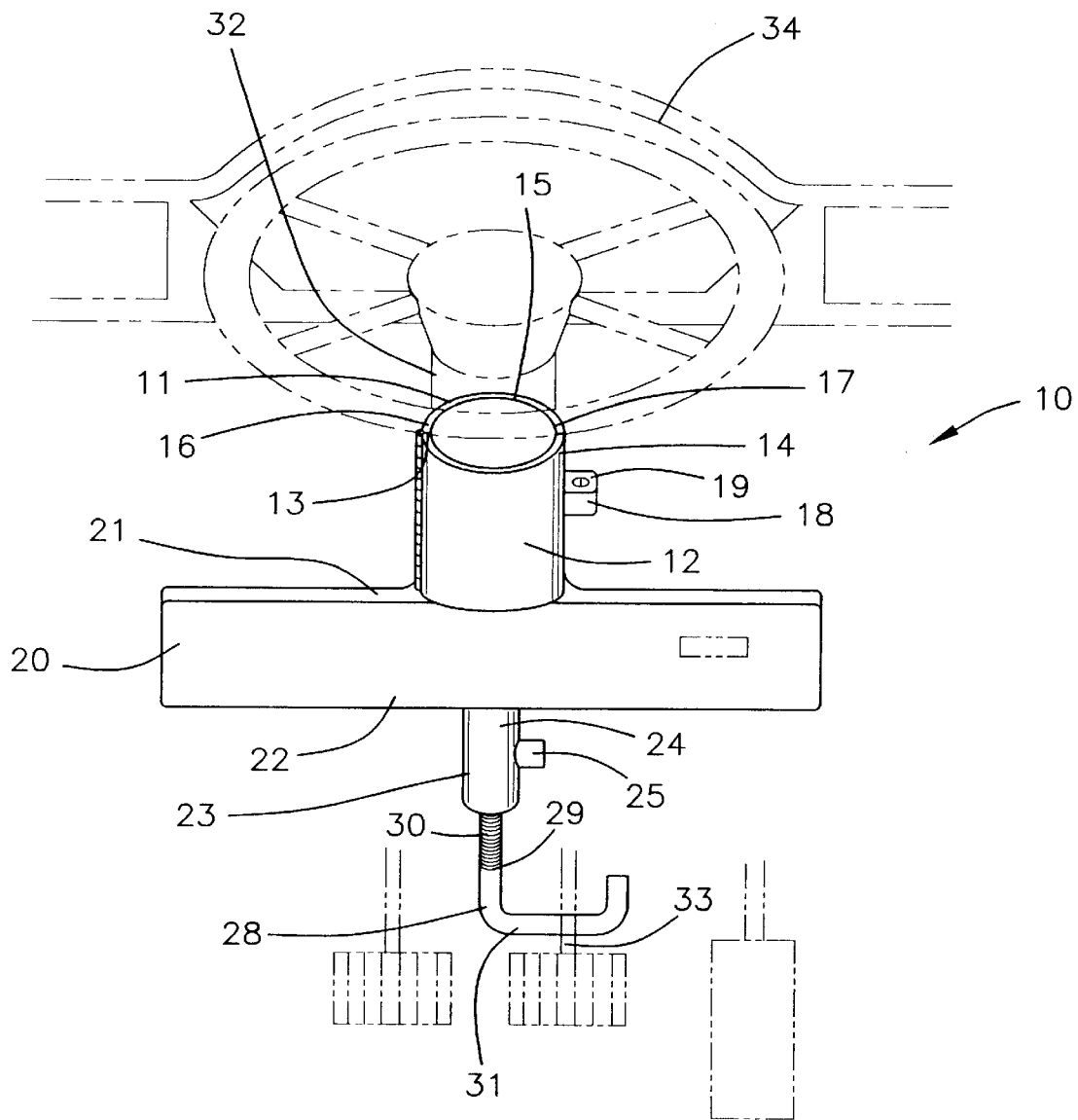
FIG. 1 is a perspective view of a new anti-theft security device for vehicles according to the present invention and shown in use.
Figure 2:
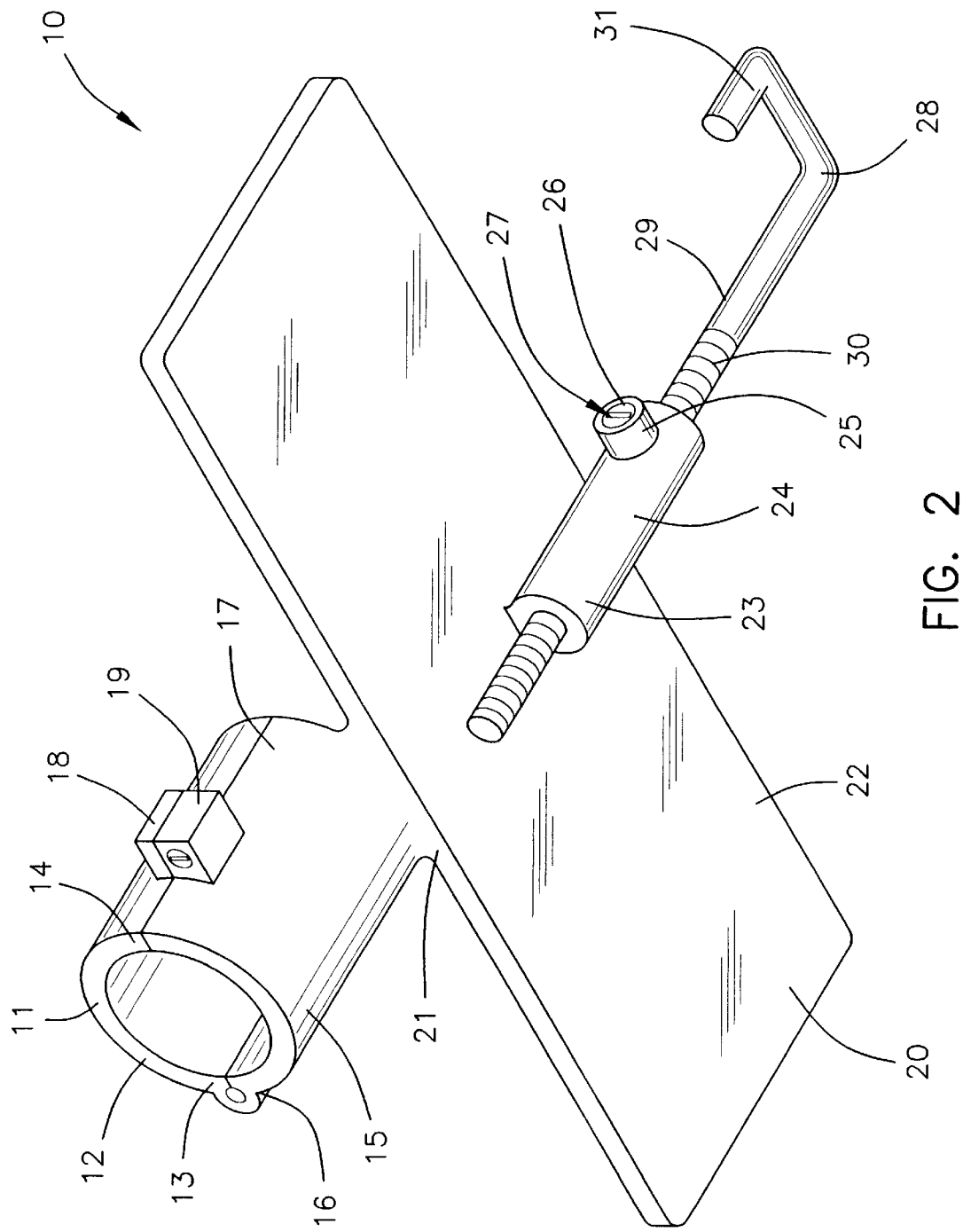
FIG. 2 is a perspective view of the present invention.

With reference now to the drawings, and in particular to FIGS. 1 through 2 thereof, a new anti-theft security device for vehicles embodying the principles and concepts of the present invention and generally designated by the reference numeral 10 will be described.

As best illustrated in FIGS. 1 through 2, the anti-theft security device for vehicles 10 generally comprises a tubular member 11 being adapted to be removably, securely and lockingly fastened about a steering wheel column 32. The tubular member 11 includes a pair of semi-cylindrical members 12,15 each having a first longitudinal edge 13,16 being hingedly attached to the first longitudinal edge 13,16 of the other of the semi-cylindrical members 12,15. Each of the semi-cylindrical members 12,15 also includes a block-shaped lock 18,19 being securely and conventionally attached near a second longitudinal edge 14,17 and being lockingly and removably attached to the block-shaped lock 18,19 of the other of the semi-cylindrical members 12,15 to lock the second longitudinal edges 14,17 of the semi-cylindrical members 12,15 together about the steering wheel column 32.

A shield/support member 20 is integrally attached to the tubular member 11. The shield/support member 20 is a plate-like member having a length and being integrally attached to an end of one 15 of the semi-cylindrical members 12,15 and also being adapted to shield an ignition, hood latch release, and underside of the steering wheel column 32. The one semi-cylindrical member 15 is securely and integrally attached at a middle portion of a top edge 21 of the plate-like member 20.

An arm locking member 23 is securely and conventionally attached to the shield/support member 20. The arm locking member 23 is generally a sleeve 24 having a boss 25 being conventionally disposed upon a side wall thereof, and also has a locking mechanism 26 conventionally disposed in the boss 25 and having a keyhole 27 disposed in the locking mechanism 26. The sleeve 24 is securely and conventionally attached upon a side and at a bottom edge 22 of the plate-like member 20.

An arm member 28 is movably and lockingly attached to the arm locking member 23. The arm member 28 includes an elongate main portion 29 having an end portion 30 of which is threaded and is lockingly and movably extended in the sleeve 24, and also includes a hook-like portion 31 being adapted to extend about a lever 33 of a brake pedal of the vehicle 34.

In use, the user securely fastens and locks the tubular member 11 about the steering wheel column 32 and lockingly extends the hook-like portion 31 of the arm member 28 about the lever 33 of the brake pedal to prevent a theft from being able to manipulate the brake pedal with the shield/support member 20 being disposed over the ignition, the underside of the steering wheel column 32, and the hood latch release.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An anti-theft security device for vehicles comprising:
a tubular member being removably and securely and lockingly fastened about a steering wheel column;
a shield/support member being integrally attached to said tubular member;
an arm locking member being securely attached to said shield/support member; and
an arm member being movably and lockingly attached to said arm locking member;
wherein said tubular member includes a pair of semi-cylindrical members each having a first longitudinal edge being hingedly attached to said first longitudinal edge of the other of said semi-cylindrical members;
wherein said shield/support member is a plate-like member having a length and being integrally attached to an end of one of said semi-cylindrical members and also being adapted to shield an ignition, hood latch release, and underside of the steering wheel column;
wherein said one of said semi-cylindrical members is securely and integrally attached at a middle portion of a top edge of said plate-like member.

2. An anti-theft security device as described in claim 1, wherein each of said semi-cylindrical members also includes a block-shaped lock being securely attached near a second longitudinal edge and being lockingly and removably attached to said block-shaped lock of the other of said semi-cylindrical members.

3. An anti-theft security device as described in claim 1, wherein said arm locking member is generally a sleeve having a boss being disposed upon a side wall thereof, and also has a locking mechanism disposed in said boss and having a keyhole disposed in said locking mechanism.

4. An anti-theft security device as described in claim 3, wherein said sleeve is securely attached upon a side and at a bottom edge of said plate-like member.

5. An anti-theft security device as described in claim 3, wherein said arm member includes an elongate main portion having an end portion of which is threaded and being lockingly and movably extended in said sleeve, and also includes a hook-like portion being adapted to extend about a lever of a brake pedal of the vehicle.

6. An anti-theft security device as described in claim 1, wherein said arm member includes an elongate main portion having an end portion of which is threaded and is movably extended in said sleeve, and also includes a hook portion for extending about a lever of a brake pedal of the vehicle.

7. An anti-theft security device for vehicles comprising:

a tubular member being adapted to be removably, securely and lockingly fastened about a steering wheel column, said tubular member including a pair of semi-cylindrical members each having a first longitudinal edge being hingedly attached to said first longitudinal edge of the other of said semi-cylindrical members, each of said semi-cylindrical members also including a block-shaped lock being securely attached near a second longitudinal edge and being lockingly and removably attached to said block-shaped lock of the other of said semi-cylindrical members to lock said second longitudinal edges of said semi-cylindrical members together about the steering wheel column;

a shield/support member being integrally attached to said tubular member, said shield/support member being a plate-like member having a length and being integrally attached to an end of one of said semi-cylindrical members and also being adapted to shield an ignition, hood latch release, and underside of the steering wheel column, said semi-cylindrical member being securely and integrally attached at a middle portion of a top edge of said plate-like member;

an arm locking member being securely attached to said shield/support member, said arm locking member being generally a sleeve having a boss being disposed upon a side wall thereof, and also having a locking mechanism disposed in said boss and having a keyhole disposed in said locking mechanism, said sleeve being securely attached upon a side and at a bottom edge of said plate-like member; and an arm member being movably and lockingly attached to said arm locking member, said arm member including an elongate main portion having an end portion of which is threaded and being lockingly and movably extended in said sleeve, and also including a hook-like portion being adapted to extend about a lever of a brake pedal of the vehicle.

8. An anti-theft security device for vehicles comprising:

a tubular member for removably fastening about a steering wheel column;

a shield/support member attached to said tubular member;

an arm locking member attached to said shield/support member; and an arm member being movably attached to said arm locking member;

wherein said tubular member includes a pair of semi-cylindrical members each having a first longitudinal edge being hingedly attached to said first longitudinal edge of the other of said semi-cylindrical members;

wherein said shield/support member comprises a plate member for shielding an ignition, hood latch release, and an underside of the steering wheel column, said plate member being attached to an end of one of said semi-cylindrical members;

wherein said arm locking member generally comprises a sleeve having a boss being located on a side wall of said arm locking member, and a locking mechanism mounted on said boss.

9. An anti-theft security device as described in claim 8, wherein each of said semi-cylindrical members also includes a lock attached near a second longitudinal edge and being lockingly and removably attached to said lock of the other of said semi-cylindrical members.

10. An anti-theft security device as described in claim 8, wherein said sleeve is attached to a side and a bottom edge of said plate member.

* * * * *